United States Patent
Choi

(10) Patent No.: US 7,976,581 B2
(45) Date of Patent: Jul. 12, 2011

(54) ELECTRIC POWER GENERATION CONTROL METHOD DURING IDLE CHARGE IN HYBRID ELECTRIC VEHICLE

(75) Inventor: Yong Kak Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 908 days.

(21) Appl. No.: 11/940,730

(22) Filed: Nov. 15, 2007

(65) Prior Publication Data

US 2008/0147259 A1    Jun. 19, 2008

(30) Foreign Application Priority Data

Dec. 15, 2006   (KR) .......................... 10-2006-0128891

(51) Int. Cl.
*B60W 10/26* (2006.01)

(52) U.S. Cl. .................... 903/907; 180/65.29; 701/22

(58) Field of Classification Search .................. 903/907; 180/65.29

See application file for complete search history.

(56) References Cited

U.S. PATENT DOCUMENTS

| | | | |
|---|---|---|---|
| 5,614,809 A | | 3/1997 | Kiuchi et al. |
| 5,832,396 A | * | 11/1998 | Moroto et al. ................... 701/22 |
| 6,166,449 A | * | 12/2000 | Takaoka et al. ............. 290/40 B |
| 6,230,496 B1 | * | 5/2001 | Hofmann et al. ............... 60/706 |
| 6,507,127 B1 | * | 1/2003 | Amano et al. .............. 290/40 C |
| 6,616,570 B2 | | 9/2003 | Wakashiro et al. |
| 6,687,581 B2 | * | 2/2004 | Deguchi et al. .................. 701/22 |
| 7,659,698 B2 | * | 2/2010 | Elder et al. ...................... 320/132 |
| 2004/0030469 A1 | * | 2/2004 | MacBain ......................... 701/22 |
| 2004/0030471 A1 | * | 2/2004 | Faye ................................ 701/22 |
| 2004/0117078 A1 | | 6/2004 | Corcione et al. |

FOREIGN PATENT DOCUMENTS

| | | |
|---|---|---|
| JP | 05-272349 | 10/1993 |
| JP | 06-280654 | 10/1994 |
| JP | 06-288246 | 10/1994 |
| JP | 10-042403 | 2/1998 |
| JP | 2000-197210 | 7/2000 |
| JP | 2001-095105 | 4/2001 |
| JP | 2001-304387 | 10/2001 |
| JP | 2004-112997 | 4/2004 |
| JP | 2004-225563 | 8/2004 |
| JP | 2005-023886 | 1/2005 |
| JP | 2005-023888 | 1/2005 |
| JP | 2005-304201 | 10/2005 |
| JP | 2006-104992 | 4/2006 |

* cited by examiner

*Primary Examiner* — Shelley Chen
(74) *Attorney, Agent, or Firm* — Morgan, Lewis & Bockius LLP

(57) ABSTRACT

A method of controlling electric power generation during idle charge in a hybrid electric vehicle. The method includes determining whether an idle charge condition is satisfied; if the idle charge condition is satisfied, calculating a first charge power amount based on whether a load is applied, a gear shift position, and a state of charge of a battery; calculating a target charge speed based on the first charge power amount; calculating an altitude correction coefficient based on atmospheric pressure; calculating a second charge power amount based on the altitude correction coefficient and the first charge power amount; and controlling an amount of power generation and an amount of battery charge based on the second charge power amount.

3 Claims, 1 Drawing Sheet

ELECTRIC POWER GENERATION CONTROL METHOD DURING IDLE CHARGE IN HYBRID ELECTRIC VEHICLE

CROSS-REFERENCE TO RELATED APPLICATION

This application claims the benefit under 35 U.S.C. §119(a) of Korean Patent Application No. 10-2006-0128891, filed on Dec. 15, 2006, the entire contents of which are incorporated herein by reference.

BACKGROUND OF THE INVENTION (a) Field of the Invention

The present invention relates to an electric power generation control method during idle charge in a hybrid electric vehicle (HEV). More particularly, the present invention maintains an engine load at an appropriate level by adjusting the amount of power generation depending on an altitude correction coefficient, controls a generation load and RPM depending on whether or not an air conditioner operates and based on a gear shift position, and corrects the RPM by inputting a correction value for the amount of power generation, if an actual RPM drops below a reference value in preparation of a target charge RPM.

(b) Background Art

The term "hybrid vehicle," in its broadest sense, refers to a vehicle that utilizes at least two different kinds of power sources. Usually, the term refers to a vehicle that uses fuel and an electric motor, driven by a battery. Such a vehicle is more precisely called a hybrid electric vehicle (HEV).

The hybrid electric vehicle can take on many various structures. Most hybrid electric vehicles are either parallel type or series type.

The parallel type hybrid electric vehicle is configured such that the engine charges the battery and also directly drives the vehicle together with the electric motor. Such a parallel type hybrid electric vehicle has a shortcoming in that its structure and control logic are relatively complicated compared to the series type. Nevertheless, since this parallel type hybrid electric vehicle is efficient in that it utilizes the mechanical energy of the engine and the electric energy of the battery simultaneously, it is widely adopted in passenger cars, etc.

A typical hybrid electric vehicle is equipped with a hybrid control unit (HCU) for controlling the overall operation of the vehicle. For example, the HCU includes an engine control unit (ECU), a motor control unit (MCU), a transmission control unit (TCU), a battery management system (BMS), a full auto temperature controller (FATC) for controlling the interior temperature of the vehicle and the like.

These control units are interconnected via a high-speed CAN communication line with the hybrid control unit as an upper controller so that they mutually transmit and receive information.

In addition, the hybrid electric vehicle includes a high voltage battery, or main battery, for supplying the driving power of the electric motor. The high voltage battery supplies a needed power while continuously charging and discharging during driving.

The high voltage battery supplies (discharges) electric energy during the motor assist operation and stores (charges) electric energy during regenerative braking or engine driving. The battery management system (BMS) transmits the battery state of charge (SOC), available charge power, available discharge power, etc., to the HCU/MCU to perform safety and lifespan management of the battery.

A typical hybrid electric vehicle performs motor assist continuously when driving uphill at high altitudes. The SOC is therefore lowered to a minimum level that the high voltage battery can control. Electric power is generated to prevent the SOC from being lowered, and the motor assist and charge are repeated in accordance with the SOC. However, if the SOC reaches the minimum level, electric power is generated continuously to recover the SOC.

Accordingly, the power corresponding to the maximum capacity of the engine is taken and transmitted to the high voltage battery for the recovery of the SOC as soon as possible.

Moreover, during idle, the electric power is also generated to recover the SOC. The power corresponding to the maximum value of idle torque is used for this generation.

However, in the conventional method, the engine transmits the power to the motor even if the air conditioner is turned on or if other loads are applied to the engine. This is a problem when driving at high altitudes, because, for example, if the air conditioner is turned on, a greater power is needed. In this case, if the same amount of generation as is used at sea level is generated, it may exceed the allowable power of the engine, thus causing engine stall.

As less oxygen is available at high altitudes, the engine power is reduced. If the electric power is generated to the same extent as at sea level, a load higher than the engine output is applied to the engine, thus causing a risk of engine stall.

Accordingly, it is necessary to set the generation amount within the allowable capacity of the engine while charging the high voltage battery in the hybrid electric vehicle and, especially, to improve the method for setting the generation amount and for controlling the charge at high altitudes.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A method of controlling electric power generation during idle charge in a hybrid electric vehicle. The method includes determining whether an idle charge condition is satisfied; if the idle charge condition is satisfied, calculating a first charge power amount based on whether a load is applied, a gear shift position, and a state of charge of a battery; calculating a target charge speed based on the first charge power amount; calculating an altitude correction coefficient based on atmospheric pressure; calculating a second charge power amount based on the altitude correction coefficient and the first charge power amount; and controlling an amount of power generation and an amount of battery charge based on the second charge power amount.

The method may further include obtaining an actual charge speed, and calculating a generation amount correction coefficient based on a difference between the target charge speed and the actual charge speed. Calculating the second charge power amount is further based on the generation amount correction coefficient.

The method may further include calculating a target charge torque value based on the second charge power amount and the target charge speed, and controlling a generation load and an actual charge speed based on the target charge speed and the target charge torque value.

DETAILED DESCRIPTION OF PREFERRED EMBODIMENTS

Figure 1:
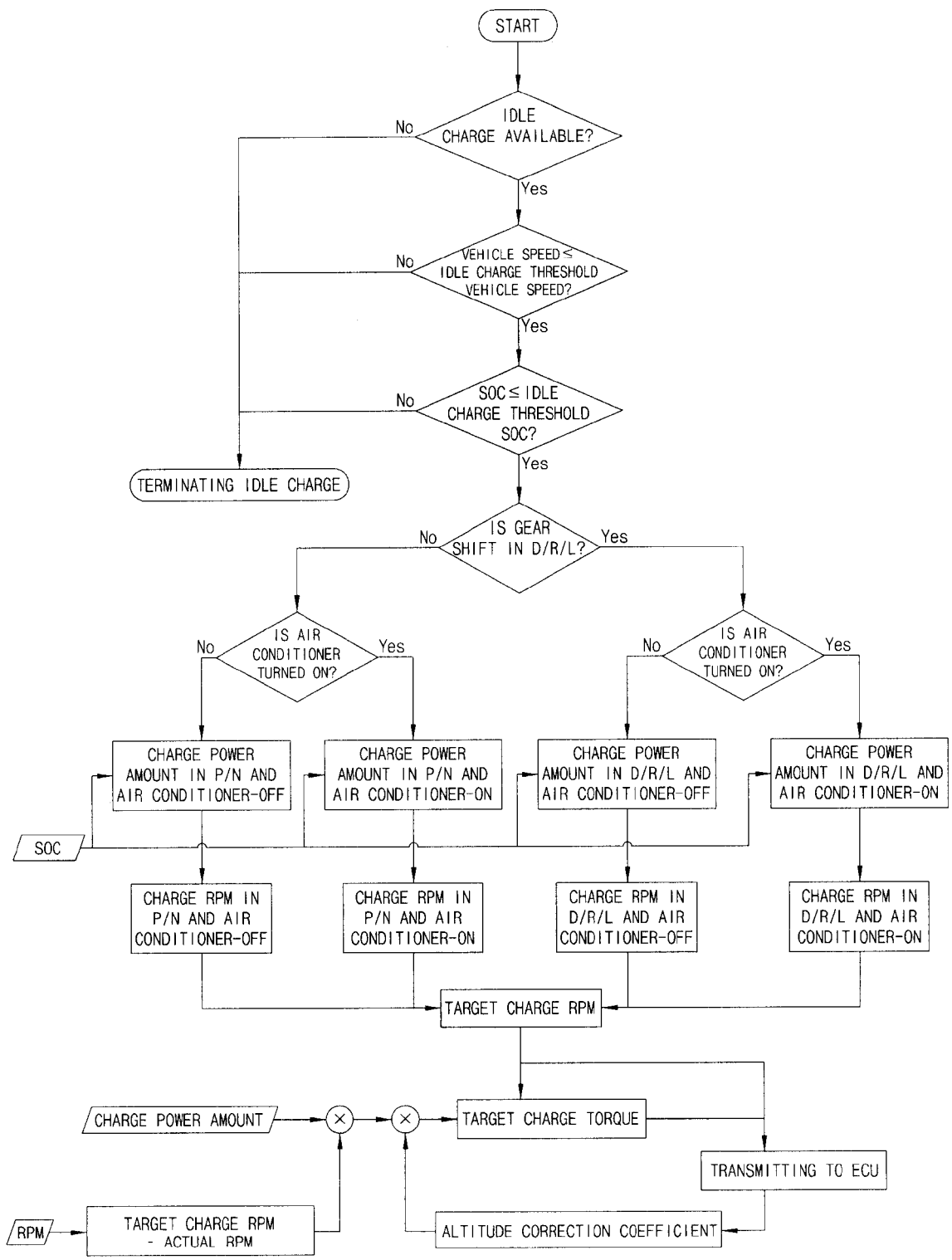
FIG. 1 is a flowchart showing a process of calculating a target charge RPM and charge torque based on an altitude correction and an amount of generation load in an electric power generation control method in accordance with the present invention.

Reference will now be made in detail to the preferred embodiments of the present invention, examples of which are illustrated in the drawing attached hereinafter. The embodiments are described below so as to explain the present invention by referring to the FIGURE.

A hybrid electric vehicle according to embodiments of the present invention has a high voltage battery charged by the engine to recover the state of charge (SOC) of the high voltage battery. Engine power is reduced at high altitudes where there is less available oxygen.

To avoid engine stall at high altitudes, an engine control unit (hereinafter referred to as ECU) calculates an altitude correction coefficient based on a signal of an atmosphere sensor attached to the engine, and transmits the calculated altitude correction coefficient to a hybrid control unit (hereinafter referred to as HCU). If the input altitude correction coefficient is below a reference value, the HCU adjusts the amount of power generation to maintain the engine load at an appropriate level.

Moreover, embodiments of the present invention control generation load and RPM depending on whether or not an air conditioner is on and based on a gear shift position, thus improving noise and vibration due to the generation load, and corrects the RPM by inputting a correction value for the amount of power generation, if an actual RPM drops below a reference value in preparation of a target charge RPM.

Referring to FIG. 1, first, the HCU determines whether or not idle charge is available. If so, the HCU determines whether or not the vehicle is at a speed at which idle charge is permitted, i.e., whether the vehicle speed is below a threshold vehicle speed.

If the vehicle speed is below the threshold speed, the HCU determines whether or not the current SOC corresponds to an idle charge SOC.

If the SOC is an idle charge SOC, the HCU determines whether or not a load, e.g. an air conditioner, is operating, and calculates an idle charge power amount based on whether a load is operating, the current gear shift position, and the SOC, such as through a map table.

Different charge power amounts are calculated based on the speed and the load, such as the four charge power amounts illustrated.

Subsequently, a charge RPM is calculated based on the calculated charge power amount, and is transmitted to the ECU as a target charge RPM.

The HCU receives information on the actual current RPM and calculates a generation amount correction coefficient based on the difference between the actual and target values. Moreover, the HCU calculates an altitude correction coefficient based on the signal of the atmosphere sensor input from the ECU and multiplies the idle charge power amount by the generation amount correction coefficient and the altitude correction coefficient in turn, thus calculating a final charge power amount.

The HCU controls the amount of power generation and amount of battery charge in accordance with the final charge power amount. Furthermore, a target charge torque value is calculated based on the final charge power amount and the target charge RPM, and is transmitted to the ECU. The ECU controls the generation load and RPM in accordance with the target charge RPM and target charge torque.

According to embodiments of the present invention, management of the SOC is enhanced under high altitude conditions, deterioration in fuel efficiency and exhaust performance due to excessive charge is prevented, and engine stall is further prevented.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling electric power generation during idle charge in a hybrid electric vehicle, comprising:
   determining whether an idle charge condition is satisfied;
   if the idle charge condition is satisfied, calculating a first charge power amount based on whether a load is applied, a gear shift position, and a state of charge of a battery;
   calculating a target charge speed based on the first charge power amount;
   calculating an altitude correction coefficient based on atmospheric pressure;
   calculating a second charge power amount based on the altitude correction coefficient and the first charge power amount; and
   controlling an amount of power generation and an amount of battery charge based on the second charge power amount.

2. The method of claim 1, further comprising:
   obtaining an actual charge speed; and
   calculating a generation amount correction coefficient based on a difference between the target charge speed and the actual charge speed;
   wherein calculating the second charge power amount is further based on the generation amount correction coefficient.

3. The method of claim 1, further comprising:
   calculating a target charge torque value based on the second charge power amount and the target charge speed; and
   controlling a generation load and an actual charge speed based on the target charge speed and the target charge torque value.

* * * * *